(No Model.) 3 Sheets—Sheet 1.

A. BUEL.
DRIER.

No. 388,178. Patented Aug. 21, 1888.

WITNESSES:
John H. Deemer
C. Sedgwick.

INVENTOR:
A. Buel
BY Munn & Co.
ATTORNEYS.

(No Model.) 3 Sheets—Sheet 3.

A. BUEL.
DRIER.

No. 388,178. Patented Aug. 21, 1888.

WITNESSES:

INVENTOR:
A. Buel
BY Munn & Co
ATTORNEYS.

United States Patent Office.

ARTHUR BUEL, OF NEW YORK, N. Y.

DRIER.

SPECIFICATION forming part of Letters Patent No. 388,178, dated August 21, 1888.

Application filed May 18, 1887. Serial No. 238,623. (No model.)

*To all whom it may concern:*

Be it known that I, ARTHUR BUEL, of the city, county, and State of New York, have invented a new and Improved Drier, of which the following is a full, clear, and exact description.

Hitherto in the manufacture or treatment of white lead, whiting, and other pigments it has been the practice to dry the same in metal pans, on the bottom of which it is spread in a thin layer. This method of drying is objectionable, first, for the reason that the moisture to be driven off from the pigment is retarded in its evaporation by the layer of pigment itself, up through which the vapors must pass from the heated surface of the pan to the open air. Another objection is due to the fact that when the pigment is thoroughly dry it is in a most inconvenient shape to remove from the pan and to handle after its removal. In my patent, No. 343,755, dated June 15, 1886, I have overcome in a large degree the latter objection; but in said patent the traveling aprons are of non-absorbent material, and the moisture at the bottom of the cones of pigment is not driven off rapidly enough to prevent the pigment from sticking to the apron.

The object of my present invention is to overcome this objection; and the invention consists, principally, of a drier made endless and composed of connected slabs or sections of suitable material combined with mechanism for dropping the material to be dried upon each slab in the form of small separated balls or hillocks.

The invention further consists of a mixer for supplying the hopper, the hopper and mixer being constructed to automatically throw the latter in and out of action to regulate the feed.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
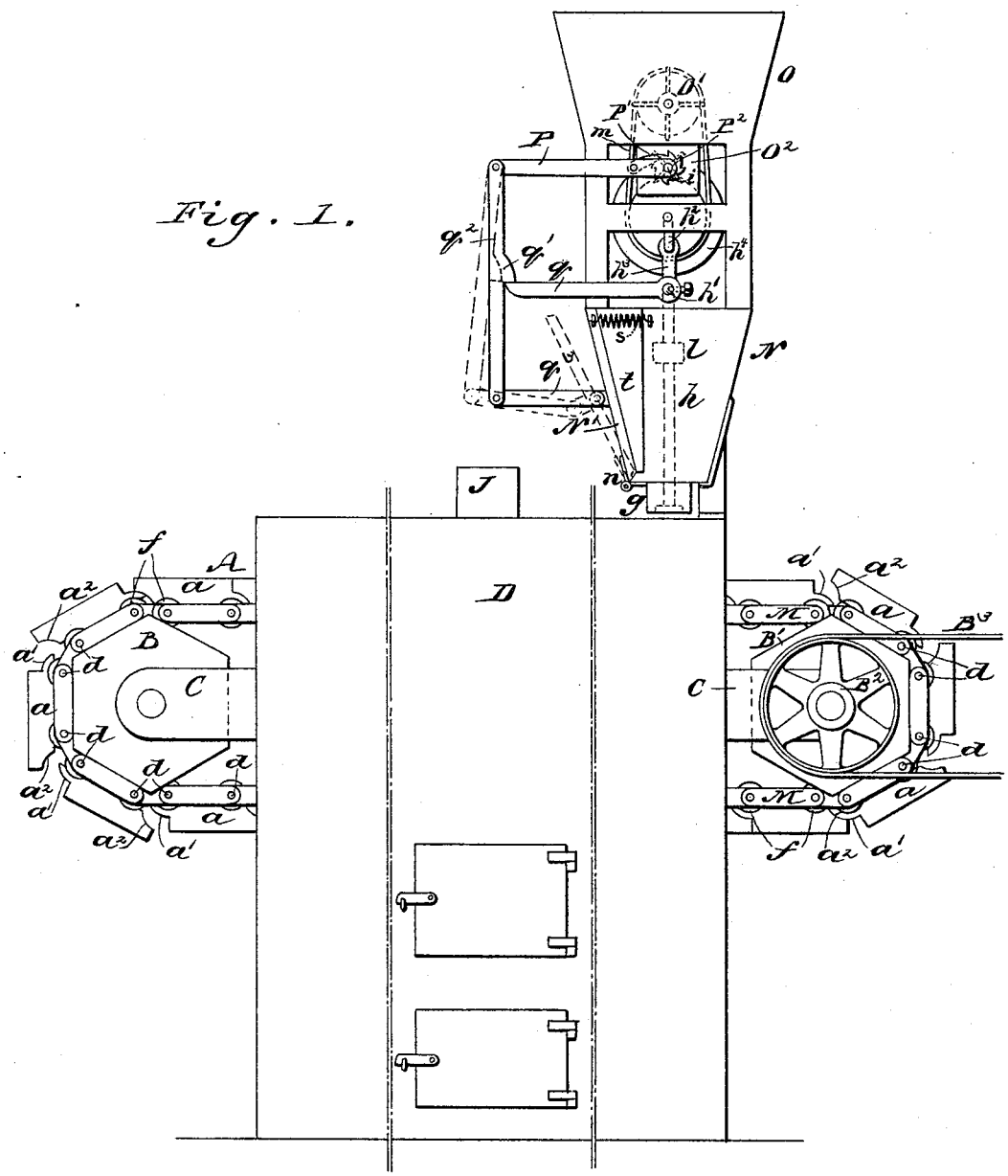
Figure 2:
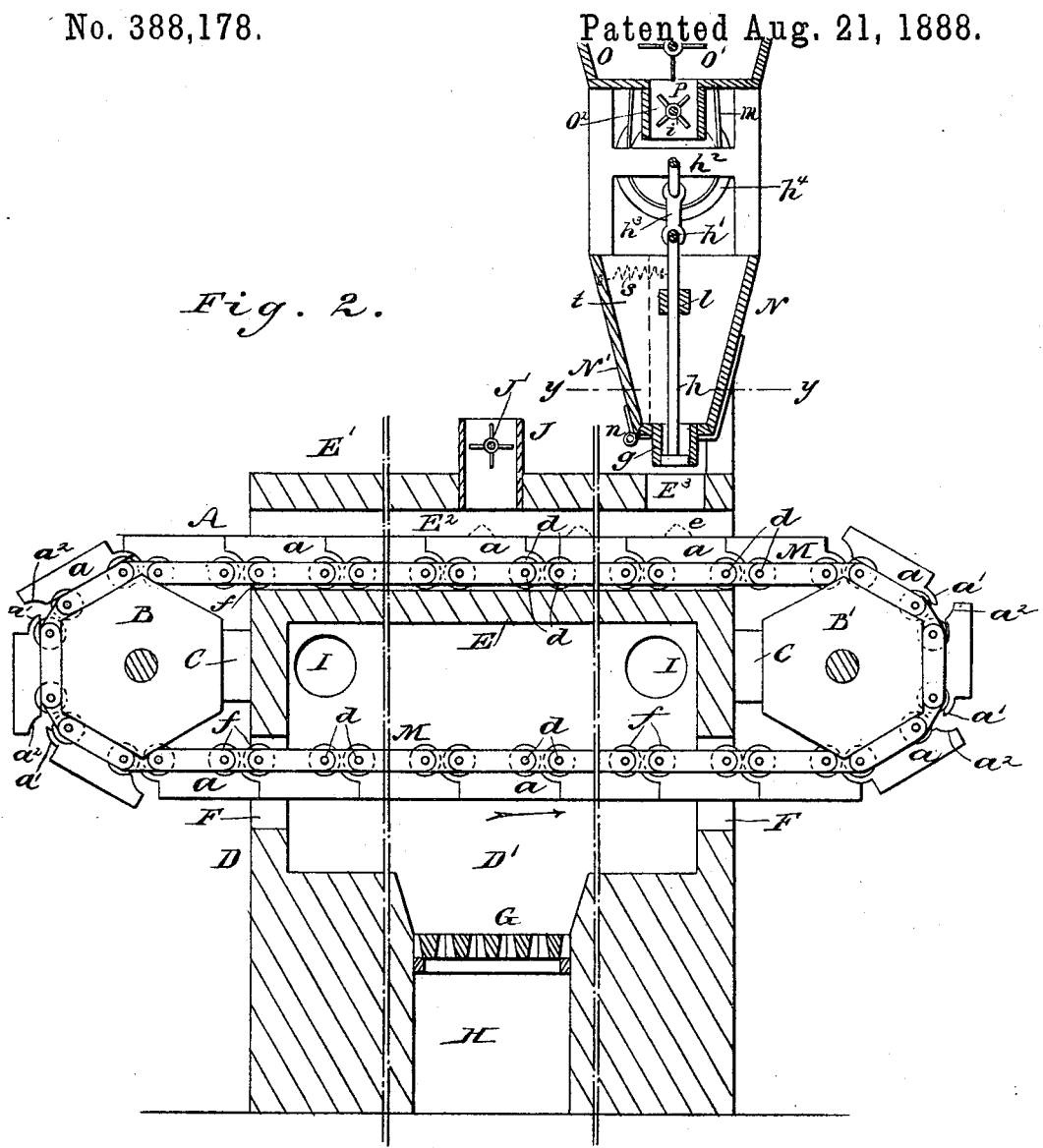
Figure 3:
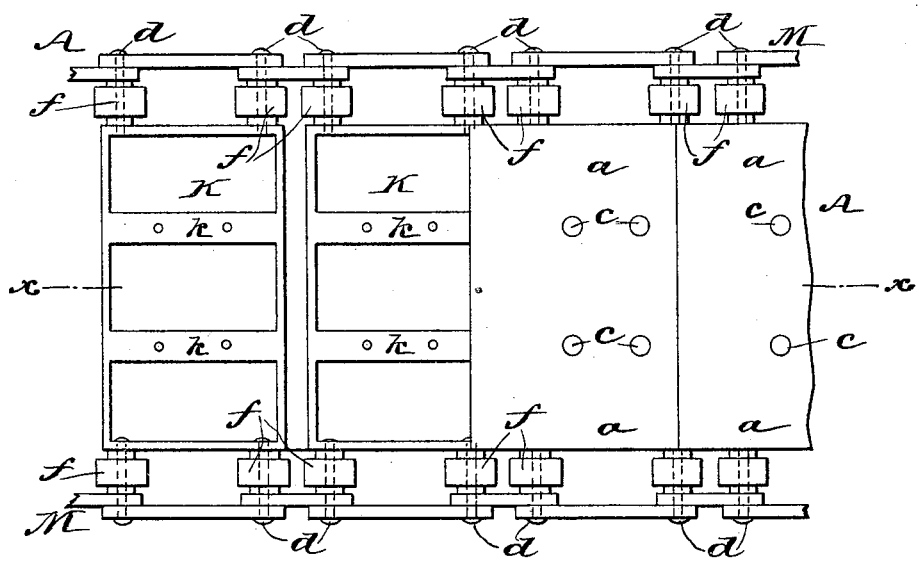
Figure 4:
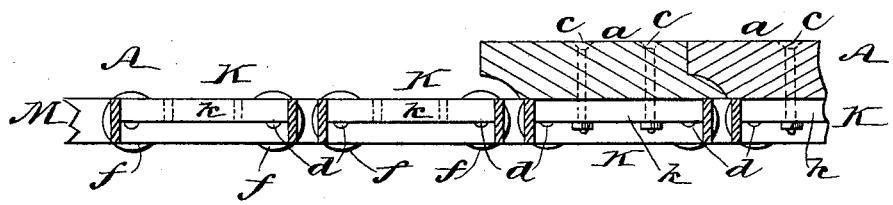
Figure 5:
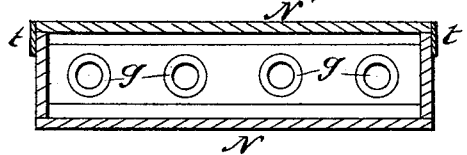

Figure 1 is a side elevation of my new and improved drier and furnace. Fig. 2 is a longitudinal sectional elevation of the same. Fig. 3 is a detailed plan view of a part of the endless tile table, showing the construction of the frame of the same. Fig. 4 is a sectional elevation taken on the line $x\ x$ of Fig. 3, and Fig. 5 is a sectional plan view of the hopper on the line $y\ y$ in Fig. 2.

A represents an endless belt or apron made up of sections or slabs of non-glazed tiling, porous stone, or other similar hard and refractory material that possesses the property of absorbing moisture when heated. This apron is placed upon the drums B B', journaled in arms C, reaching out from the sides of the furnace D. The shaft of the drum B' is provided with a pulley, B², over which the belt B³ passes, so that the drying-apron may be caused to move continuously in the direction of the arrow in Fig. 2 and directly through the furnace D. The top of the combustion-chamber D' of the furnace is formed by the bridge E, on which the upper part of the drying-apron moves, and above this bridge is formed the main top, E', of the furnace. The space E² between the top E' and the bridge E constitutes the oven in which the material is dried, the apron passing through the same, as clearly shown in Fig. 2, bearing the material upon the tiles or sections $a$ of the apron, the same being deposited thereon as hereinafter described. The lower part of the drying-apron in its return to the drum B' is carried directly through the combustion-chamber of the furnace, so that the outer surfaces of the tiles $a$ are acted upon directly by the heat, which quickly relieves them of any moisture they may contain and heats them very hot, ready for the next supply of material to be dried. The body of the furnace is constructed with openings F F at opposite sides for the passage of the drying-belt, with the grate-bars G, ash-pit H, and chimney-flues I, as shown clearly in Fig. 2. At the top of the furnace is fitted a small pipe, J, in which is placed a small exhaust-fan, J', to cause a current of air to pass from each end to the center of the oven E², to carry off the moisture and vapors rising from the material deposited upon the tiles or sections $a\ a$.

The slabs $a$ are, by preference, molded from clay, with the tongue $a'$ at one edge and the groove $a^2$ at the other, and baked, thus forming very porous and refractory slabs, the edges of which will match, as shown clearly in Fig. 1. The slabs are secured to metal frames K by bolts $c\ c$, passed through the slabs and through the center pieces, $k$, of the said metal frames, as shown in Figs. 3 and 4. The ends of the frames K are connected by the bolts $d\ d$ to the endless long-linked side chains, M M, and between the links of the said chains and the ends of the frames K are placed upon the bolts $d$ a series of small wheels or rollers $f$, to run upon the upper surface of the bridge E and prevent friction and wear, as will be understood from Fig. 2.

The hopper N is located over the opening $E^3$ in the top E of the furnace and drops the pigment to be dried down through said opening upon each of the slabs or sections $a$ as they pass successively under said opening, each section receiving its quota of material in the form of small uniform hillocks or cones $e$, distributed along its entire length. In order to deposit these small cones upon the sections $a$, I form in the bottom of the hopper numerous openings or short tubes, $g$, in each of which is fitted a plunger, $h$. These plungers are all guided by a cross-piece, $l$, and are attached at their upper ends to a rod, $h'$, which is connected to the cranks of the crank-shaft $h^2$ by the links $h^3$. This crank-shaft $h^2$ is revolved by pulley $h^4$ and belt passing over the same coming from a suitable motor, so that all of the plungers $h$ are given an up-and-down movement, and thus force stated quantities of material from the hopper through the tubes $g$ upon the slabs $a$, the motion of the plungers being timed to the speed of travel of the drying-belt.

Above the hopper N is located a primary hopper, O, into which the material to be dried is first placed. In the hopper O is placed a mixer, O', which is revolved by a belt, $m$, passing over suitable pulleys attached to the crank-shaft $h^2$ and to the shaft of the mixer. The object of this mixer is to thoroughly knead the material before it enters the passage $O^2$ at the bottom of the hopper O, ready to be delivered to the hopper N. In the passage $O^2$ is placed the rotary valve $p$, comprising in this instance four blades, which, when the valve is revolved, drop the material in stated quantities to the hopper N. The said valve is revolved intermittently by the lever P, fulcrumed upon the shaft $i$ of the valve, the pawl P', pivoted to the lever, and the ratchet-wheel $p^2$, secured upon the shaft $i$ next to the lever P. The said lever P is reciprocated vertically for revolving the valve by the horizontal arm $q$, rigidly attached to the rod $h'$, to which the plungers $h$ are attached. The outer end of this arm engages with the toe $q'$ of the plate $q^2$, pivoted to the outer end of the lever P. The lower end of the plate $q^2$ is connected by the plate $q^3$ to the side wall, N', of the lower hopper, N. This side wall is secured to the lower part of the hopper by the hinges $n$, and is held normally closed by the springs $s$. These springs are of sufficient tension to hold the wall N' closed until the hopper N is full or nearly full of the pigment or the material to be dried. When the hopper N is nearly full, the pressure upon the side wall, N', will overcome the tension of the springs $s$ and the wall N' will be forced outward to the position shown in dotted lines in Fig. 1, which will carry the toe $q'$ out of range of the arm $q$, and thus stop the feeding of the upper primary hopper, O. When the material is worked off from the lower hopper, N, the springs $s$ will return the side wall, N', and bring the toe $q'$ again into range of the arm $q$, whereupon the feeding from the upper to the lower hopper will be resumed. To prevent the material from escaping the hopper N when the side wall, N', is forced outward, I provide said wall with the sheet-metal flanges $t$, which fit next to the end wall of the hopper, as shown in Fig. 1.

By the use of the two hoppers and the mechanism described the feed of the material to be dried is automatically controlled, so that no attention need be paid to it, and by timing the reciprocation of the plungers $h$ with the speed of the drying-apron A each section $a$ of the belt will receive a deposit of material in the shape of a row of small cones, and by the use of the non-glazed tiling for the sections of the drying-apron as soon as the material is dropped upon them (the same being highly heated in the furnace) the moisture at the bottom or contact portion of the cone with the tile is rapidly absorbed by the porous and absorptive property of the tile and the bottom becomes almost instantly dry and hard, so that by the time the material is carried to the end of the apparatus each cone will drop off in a hard homogeneous lump without waste, without adherence to the tiles, and in a most convenient shape for handling.

Having thus described my invention, what I claim as new, and desire to secure by Letters Patent, is—

1. The sections $a$ of porous refractory material secured to suitable frames and connected together to form an endless apron, and the drums B B', over which the apron passes, in combination with the furnace having openings F to the fire-box for the lower part of the apron and a drying-oven above, the hopper N, and means for dropping the material from the hopper to each of the sections $a$, substantially as described.

2. The furnace formed with the apertures F and oven $E^2$ above the bridge E, in combination with the drums B B' and the endless drying-apron A, arranged to pass through said apertures and oven over the bridge E, substantially as shown and described.

3. The hopper N, having numerous apertures in its bottom and plungers working therein and a hinged side held normally closed by springs, in combination with a rotary feed-valve in the upper primary hopper and means, substantially as described, whereby the outward movement of the side N' throws the feed-valve out of action, substantially as described.

ARTHUR BUEL.

Witnesses:
 H. A. WEST,
 C. SEDGWICK.